US008607217B2

(12) United States Patent
Thota et al.

(10) Patent No.: US 8,607,217 B2
(45) Date of Patent: Dec. 10, 2013

(54) INCREMENTAL UPGRADE OF ENTITY-RELATIONSHIP SYSTEMS

(75) Inventors: Shireesh K. Thota, Issaquah, WA (US); Anna Wawrzyniak, Seattle, WA (US); Charlie D. Carson, Bellevue, WA (US); Aditya Ashok Sarpotdar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 13/093,691

(22) Filed: Apr. 25, 2011

(65) Prior Publication Data
US 2012/0272225 A1 Oct. 25, 2012

(51) Int. Cl.
*G06F 9/44* (2006.01)

(52) U.S. Cl.
USPC .......................................................... 717/168

(58) Field of Classification Search
USPC .......................................................... 717/168
See application file for complete search history.

(56) References Cited

U.S. PATENT DOCUMENTS

| | | | |
|---|---|---|---|
| 6,711,593 B1 | 3/2004 | Gordon et al. | |
| 7,353,231 B1 | 4/2008 | Eslambolchi et al. | |
| 7,610,298 B2 * | 10/2009 | Zaytsev et al. | 707/999.101 |
| 7,730,182 B2 * | 6/2010 | Mital et al. | 709/226 |
| 7,856,454 B2 * | 12/2010 | Barnes Leon et al. | 707/793 |
| 8,117,136 B2 * | 2/2012 | Yang | 706/11 |
| 8,122,061 B1 * | 2/2012 | Guinness | 707/802 |
| 8,356,029 B2 * | 1/2013 | Djugash et al. | 707/716 |
| 2005/0086384 A1 * | 4/2005 | Ernst | 709/248 |
| 2007/0226169 A1 * | 9/2007 | Solyanik et al. | 707/1 |
| 2007/0226728 A1 * | 9/2007 | Thorson et al. | 717/168 |
| 2007/0250408 A1 * | 10/2007 | Leon et al. | 705/28 |
| 2009/0019391 A1 * | 1/2009 | Bechtel et al. | 715/810 |
| 2009/0049056 A1 | 2/2009 | Shutt et al. | |
| 2009/0313280 A1 | 12/2009 | Sawaya et al. | |
| 2009/0319564 A1 * | 12/2009 | Kantabutra | 707/103 R |
| 2010/0082646 A1 * | 4/2010 | Meek et al. | 707/752 |
| 2010/0138821 A1 | 6/2010 | Driesen et al. | |
| 2010/0162226 A1 | 6/2010 | Borissov et al. | |
| 2010/0229187 A1 * | 9/2010 | Marwah et al. | 719/318 |
| 2010/0241637 A1 * | 9/2010 | Kissner et al. | 707/752 |
| 2012/0030515 A1 * | 2/2012 | Birakoglu et al. | 714/38.1 |

OTHER PUBLICATIONS

Badia, "Entity-Relationship Modeling Revisited", Mar. 2004, SIGMOD, vol. 33, No. 1.*

(Continued)

*Primary Examiner* — Anna Deng
*Assistant Examiner* — Junchun Wu
(74) *Attorney, Agent, or Firm* — Workman Nydegger

(57) ABSTRACT

Embodiments are directed to incrementally upgrading an entity-relationship system. In an embodiment, a computer system receives an indication that one instance including its own specified set of entities is to be upgraded to a second instance including a different specified set of entities. The computer system accesses the two instances to determine the differences between the entities of each instance. The computer system then discovers, based on the determined differences between the two instances, a set of actions that, when executed, change the entities of the first instance to the entities of the second instance. The set of actions is ordered such that processing order constraints are respected. The computer system then incrementally upgrades the entities of the first instance to the entities of the second instance by processing the determined set of actions in the appropriate, constraint-aware order.

15 Claims, 4 Drawing Sheets

(56) References Cited

OTHER PUBLICATIONS

Czejdo et al. "Semantics of Update Operations for an Extended Entity-Relationship Model", 1988, ACM.*

Ling et al., "View update in entity-relationship approach", 1996, Elsevier Science, pp. 135-169.*

Viv Schupmann, et al., Oracle Database High Availability Overview, 11g Release 2 (11.2), Aug. 2009, (132 pages).

Brian A. Randall, Introducing Visual Studio 2005 Team Edition for Database Professionals, Mar. 31, 2011 (Retrieve Date), (9 pages).

SQL Compare 9.0, Mar. 31, 2011 (Retrieve Date), (2 pages).

* cited by examiner

1

INCREMENTAL UPGRADE OF ENTITY-RELATIONSHIP SYSTEMS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to organize and store information. For example, entity-relationship systems may be used to define entities and the relationships between the entities. The relationships may indicate dependencies or inheritances between the entities. Thus, when operations are performed on one entity, other entities may be directly affected as a result of their relationships with the entity. Like most software systems, entity-relationship systems need to be upgraded over time. These upgrades typically involve creating a separate instance of all of the entities and then copying the state information from the old instance to the new instance. Such copying is problematic for large amounts of information.

BRIEF SUMMARY

Embodiments described herein are directed to incrementally upgrading an entity-relationship system. In one embodiment, a computer system receives an indication that one instance including its own specified set of entities is to be upgraded to a second instance including a different specified set of entities. The second instance includes at least one entity that is different from the original specified set of entities. The computer system accesses the two instances to determine the differences between the entities of each instance. The computer system then discovers, based on the determined differences between the two instances, a set of actions that, when executed, change the entities of the first instance to the entities of the second instance. The set of actions is ordered such that processing order constraints are respected. The computer system then incrementally upgrades the entities of the first instance to the entities of the second instance by processing the determined set of actions in the appropriate, constraint-aware order.

In another embodiment, a computer system accesses both a first instance that includes a first specified set of entities and a second instance that includes a second specified set of entities. The computer system compares the entities of the first instance to the entities of the second instance to determine the differences between the entities. The computer system then analyzes the differences between the entities of the first and second instances and generates a list of actions that are to be performed to upgrade the entities of the first instance to the second instance. The computer system optimizes the generated list of actions by grouping actions that are performable together in the same group, and sorts the grouped actions according to a processing order that respects existing constraints between the entities. The computer system also generates a domain-specific executable function that, when executed, upgrades the entities of the first instance to the second instance according to the entities' groupings and sorted processing order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
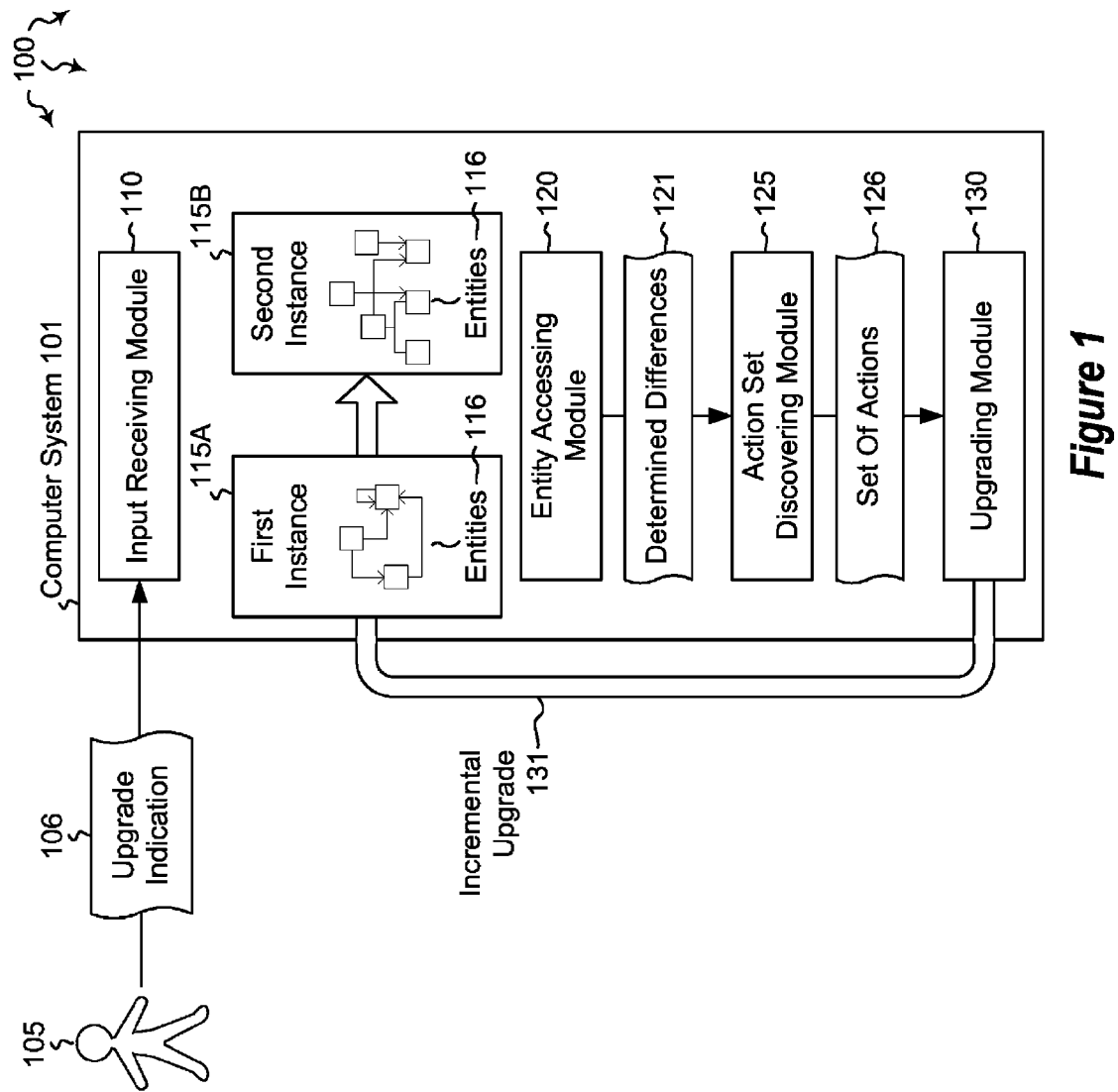
FIG. 1 illustrates a computer architecture in which embodiments of the present invention may operate including incrementally upgrading an entity-relationship system.

Embodiments described herein are directed to incrementally upgrading an entity-relationship system. In one embodiment, a computer system receives an indication that one instance including its own specified set of entities is to be upgraded to a second instance including a different specified set of entities. The second instance includes at least one entity that is different from the original specified set of entities. The computer system accesses the two instances to determine the differences between the entities of each instance. The computer system then discovers, based on the determined differences between the two instances, a set of actions that, when executed, change the entities of the first instance to the entities of the second instance. The set of actions is ordered such that processing order constraints are respected. The computer system then incrementally upgrades the entities of the first instance to the entities of the second instance by processing the determined set of actions in the appropriate, constraint-aware order.

In another embodiment, a computer system accesses both a first instance that includes a first specified set of entities and a second instance that includes a second specified set of entities. The computer system compares the entities of the first instance to the entities of the second instance to determine the differences between the entities. The computer system then analyzes the differences between the entities of the first and second instances and generates a list of actions that are to be performed to upgrade the entities of the first instance to the second instance. The computer system optimizes the generated list of actions by grouping actions that are performable together in the same group, and sorts the grouped actions according to a processing order that respects existing constraints between the entities. The computer system also generates a domain-specific executable function that, when executed, upgrades the entities of the first instance to the second instance according to the entities' groupings and sorted processing order.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of computer system configured to receive and process inputs. For example, the computer system may be configured to receive inputs 106 from user 105. In some cases, those inputs may be upgrade indications. The upgrade indications may indicate that a system or program is to be updated. For instance, an instance of an entity-relationship model may be upgraded to a newer instance. As used herein, an entity-relationship model or entity-relationship system may refer to a way to define a system consisting of well-defined entities and relationships modeled among them. Such entity-relationship models may be customized for different domains. Entity-relationship models allow administrators to define dependencies and other relationships between the entities. The entities may represent different types of objects, and may each have their own attributes or characteristics.

Upgrading from one instance (i.e. a specific set of entities) to another instance in an entity-relationship model involves complexities such as accounting for dependencies, processing order and other model constraints. For instance, some entities depend on or are related to other entities. In one example, an entity-relationship model is used in a business setting where multiple employees are employed at a particular company. Each employee may be an entity in the system. Each employee entity may have attributes such as name, address, salary, work group, and others. Employee entities in the model may be related to other entities such as resources. For example, an employee may have an assigned company car. In the model, the car has its own representative entity, with its own attributes (e.g. make, model, maintenance information, etc.). The car's assignment to a user creates a relationship between the user's entity and the car's entity in the model. Many types of entities and relationships may exist. The relationships may be any type including 1:1, 1:many, many:1, many:many or others. Thus, in the model, entities and relationships may be structured into hierarchical trees. The trees may indicate dependencies or other relationships, and may store the relationship information in corresponding metadata.

In cases where one instance (e.g. first instance 115A) is to be upgraded to another instance (e.g. second instance 115B), computer system 101 may use its various modules to incrementally upgrade the entities 116 of the first instance to those of the second instance. The computer system's entity accessing module 120 may access the two instances to determine the differences 121 between the two sets of entities. The action set discovering module 125 may determine a set of actions 126 that, when applied to the first set of entities, upgrades the first set of entities to the second set of entities. The upgrading module 130 may apply the set of actions to initiate the incremental upgrade 131. These concepts will be explained further below with regard to methods 200 and 300 of FIGS. 2 and 3, respectively.

Figure 2:
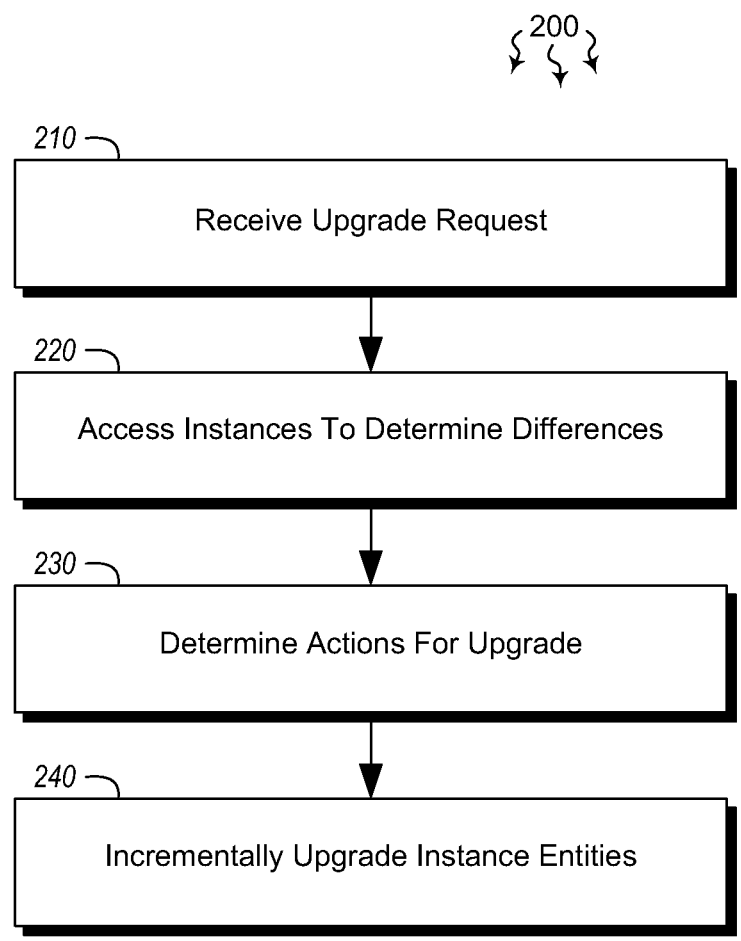
FIG. 2 illustrates a flowchart of an example method for incrementally upgrading an entity-relationship system.
Figure 3:
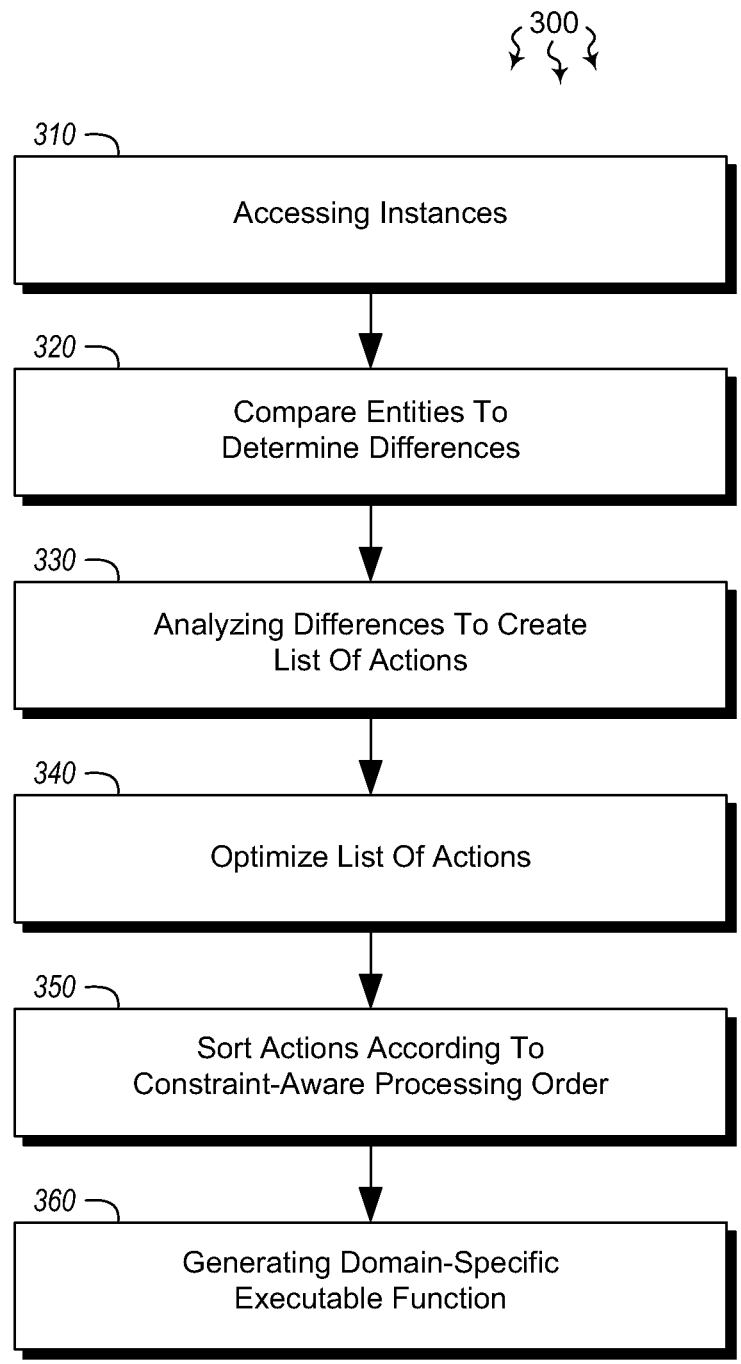
FIG. 3 illustrates a flowchart of an alternative example method for incrementally upgrading an entity-relationship system.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for incrementally upgrading an entity-relationship system. The method 200 will now be described with frequent reference to the components and data of environment 100.

Method 200 includes an act of receiving an indication that a first instance comprising a first specified set of entities is to be upgraded to a second instance comprising a second specified set of entities, the second instance including at least one entity that is different from the first specified set of entities (act 210). For example, input receiving module 110 may receive upgrade indication 106 from user 105 indicating that first instance 115A with entities 116A is to be upgraded to second instance 115B with entities 116B. As can be seen in FIG. 1, entities 116A are different than 116B. Entities 116A includes some objects that are new, some objects that have been modified (as can be seen by the different relationship arrows), and the absence of some objects that previously existed in the first instance but have since been deleted. Thus, many different changes may be made from the first instance to the second.

Method 200 includes an act of accessing the first and the second instances to determine the differences between the entities of each instance (act 220). For example, entity accessing module 120 may access instances 115A and 115B to determine the differences between the entities 116A and 116B. The differences may include changes to entity attributes or relationships, creation of new entities or deletion of previously-existing entities. In some cases, an initial analysis may mark those entities that have been modified for further inspection. A subsequent or more in-depth analysis may be used to determine which relationships and which attributes have been changed from the first instance to the second.

Method 200 includes an act of discovering, based on the determined differences between the first and second instances, a set of actions that, when executed, change the entities of the first instance to the entities of the second instance, wherein the set of actions is ordered such that processing order constraints are respected (act 230). For example, action discovering module 125 may discover, based on determined differences 121, a set of actions 126 that, when executed, upgrades the entities of instance 115A to the entities of instance 115B. The set of actions may be ordered in such a way that processing order constraints are followed. For example, some entities may be dependent on other entities (e.g. entity B is dependent on entity A). Thus, in this example, entity A would need to be processed before entity B to ensure that entity A is up-to-date before entity B is processed.

In some embodiments, the set of actions 126 may include a create entity action for elements that were not present in the first instance but were present in the second instance. This create entity action would then create the element that was not present in the first instance in the second instance. The set of actions may also include a delete entity action for elements that were present in the first instance but were not present in the second instance. This delete entity action may then delete the element that was present in the first instance but was not present in the second instance. Still further, the set of actions may include a modify entity action for elements that include at least one attribute or relationship that is different in the second instance than it is in the first instance. The modify entity action may thus be used to modify entities that have an attribute or relationship that is different in instance 115B than it is in instance 115A.

As indicated above, entities with changed attributes or relationships may be marked for further comparison. The further comparison may include analyzing changes of each marked entity's attributes and relationships. In some cases, the set of actions may further be analyzed to determine whether other corresponding actions are to be added to the set of actions to comply with other processing constraints. For instance, one of the entities may have dependencies or other relationships that require the processing of other entities or groups of entities before its own processing. In this manner, the analysis may discover all corresponding actions that are to be performed prior to processing the marked entity.

Method 200 also includes an act of incrementally upgrading the entities of the first instance to the entities of the second instance by processing the determined set of actions in the appropriate, constraint-aware order (act 240). For example, after the set of actions has been determined, upgrading module 130 may incrementally upgrade first instance 115A to second instance 115B, while performing the upgrade in an appropriate, constraint-aware manner. Each entity is changed according to the set of actions, and each corresponding action that is to be performed to related entities is performed in its proper order. Thus, no dependencies or other constraints are infringed during the upgrade.

Figure 4:
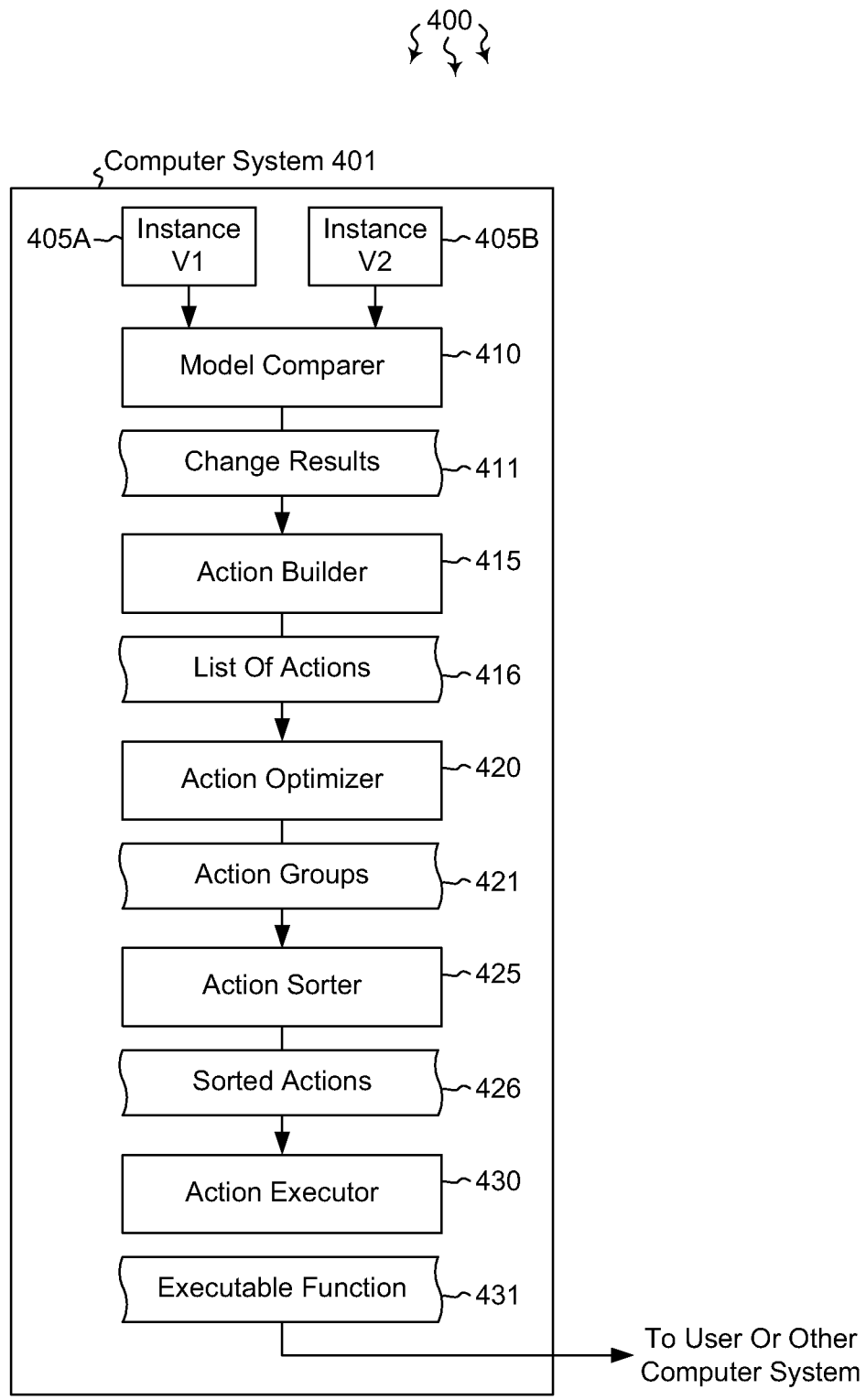
FIG. 4 illustrates an alternative computer architecture in which embodiments of the present invention may operate including upgrading an entity-relationship system.

Turning now to FIG. 3, FIG. 3 illustrates a flowchart of an alternative method 300 for incrementally upgrading an entity-relationship system. The method 300 will now be described with frequent reference to the components and data of environment 400 of FIG. 4.

Method 300 includes an act of accessing both a first instance comprising a first specified set of entities and a second instance comprising a second specified set of entities (act 310). For example, computer system 401 may access instance 405A (version 1) and instance 405B (version 2). As above, each instance includes a specified set of entities, and each of those entities has a set of attributes and/or relationships. The modules of computer system 401 are configured to incrementally upgrade instance V1 to instance V2, in an entity-by-entity fashion. In this manner, instances and their entities can be individually upgraded. Accordingly, users using this system can specify upgrades and incrementally upgrade the instances from a first version to a second version. It should be noted that the system described can be used with any type of entity-relationship system including databases.

Method 300 includes an act of comparing the entities of the first instance to the entities of the second instance to determine the differences between the entities (act 320). Model Comparer 410 may compare the schemas of instance V1 (405A) and instance V2 (405B) to determine the differences, and then output change results 411. Entries in the change results may include additions, deletions or updated behavior relative to the instance V1 entries. The model comparer compares differences on each of the attribute values for those objects that are available in the schemas of instance V1 and instance V2. The comparing may involve walking through entity trees corresponding to the first and second instances, and identifying the new entities, deleted entities and modified entities. Those entities that are to be modified during the upgrade, as identified by the model comparer, may be marked and further compared to determine which specific attributes or relationships have been modified between instance versions.

Method 300 includes an act of analyzing the determined differences between the entities of the first and second instances to generate a list of actions that are to be performed to upgrade the entities of the first instance to the second instance (act 330). For example, action builder 415 may include analyzers which analyze the change results 411 received from the model comparer. The action builder uses this analysis to create a list of actions 416 that, when performed, upgrade the first instance 405A to the second instance 405B. The actions in the action list describe the intent of applying an operation (e.g. update, drop, create, etc.) on an entity.

For example, an action can represent an update on an entity that modifies an attribute value of that entity. An action may be dependent on other actions. In such cases, the action is to be executed only after the actions that it depends upon have been executed. Additionally or alternatively, actions may be merged with other actions. In such cases, a current action could be merged with other actions, which could then be executed together. This may be used to derive 'minimally correct' operations. The rules of dependencies and merge-ability are specific to each domain, and thus may be changed by implementors or authors of that domain.

Each action has a type associated with it. This type may be used to categorize and sort the actions. Examples of such types may include, but are not limited to, the following: create entity actions (action type that adds new entities), delete entity actions (action type that deletes existing entities), update entity actions (action type that modifies attributes of existing entities), unbind entity actions (action type that severs dependencies between existing entities and rebind entity actions (action type that re-establishes dependencies between existing entities). Many other types of actions not listed above may also be used. Each domain may use action types specific to that domain.

An "action group" 421 is a set of actions where any two nodes are connected to each other through one or more other actions on the basis of merge-ability. For example, if object A is mergeable with B, B is mergeable with C, then all the actions can be in an action group (even though there is no direct merge-ability edge (or line) between A and C). Based on the dependency rules between actions, similar dependencies can be extrapolated between action groups. The final set of action groups is configured to avoid any circular dependency in the set (e.g. A depends on B, B depends on C, and C depends on A). This orders the first action groups such that all other action groups that the first action group depends upon are processed before the first action group.

Thus, continuing from above, the action builder 415 converts the changes from the change result into action objects. The action builder may output two different kinds of actions: proposed actions and contributing actions. For proposed actions, each entity has a corresponding analyzer that can understand the change result entry and propose an action to achieve the effect of the change result entry. For each entry in the change results 411, there is at least one proposed action. For contributing actions, once an action is proposed, the action builder broadcasts that action to a set of other analyzers who correspond to entities that the entity of the proposed action depends upon. For a given Action (proposed or contributed), there may be one or more contributing actions needed to break the chain of dependencies between the objects. In some cases, dependencies between objects may need to be unbound for a new entity to be added.

For contributing actions, contribution may be based on existence and type of dependencies between entities, which are domain dependent. For certain types of dependencies (soft dependencies), dependency upon an object can be altered while it still has dependent objects. For certain other types of dependencies (hard), dependency upon an object cannot be altered unless the dependent object has severed the relationship. The dependency may be severed (unbound) while before an update is performed. The update may then be performed while the dependency is unbound. Once the update is finished, the dependency may be re-established (rebound).

The action builder's analyzers may thus propose an action based on a change result entry, and may contribute to an action that, in turn, was proposed by another analyzer. The analyzer thus ensures enough sets of actions exist to keep, at any intermediate state in the process of an incremental upgrade, a valid model that complies with the rules and constraints of its current domain. In some cases, an analyzer is assigned to each entity to perform the difference analysis. Just like a proposed action is sent to one or more other analyzers to determine whether the analyzers will contribute actions to the proposed set of actions based on their own constraints, a contributed action is also, in turn, sent to other analyzers. This process loops until no new action is contributed. Finally, the result of the action builder component is a collection of all the proposed and contributing actions.

Method 300 includes an act of optimizing the generated list of actions by grouping actions that are performable together in the same group (act 340). Action optimizer 420 is configured to output action groups in a manner that is optimal for execution, while ensuring that no cyclic dependencies exist between the groups. The action optimizer takes as an input a set of actions and returns a set of action groups. Each action group includes actions that are either directly or indirectly merge-able with each other. That is, if any pair of merge-able actions defines a merge-ability edge, then each action group is a connected component with respect to the merge-ability edges.

In some embodiments, the action optimizer may initially create one action group for every action, where each action group contains only the action for which it was created. That is, initial set of action groups is a set of a singletons created from the input actions. Two action groups are merge-able if there are two merge-able actions, such that first action belongs to a first action group and second action belongs to a second action group. The merging of two action groups inherits the merge-ability edges. An action group is dependent on another action group if any of the actions from the first action group depend on any of the actions from second action group. Thus, the merger of two action groups inherits the dependency edges.

The action optimizer may perform two phases. Phase 1 involves identifying dependency cycles. If action A depends on action B, the existence of dependency edge going from A to B is identified. If there is a dependency cycle (with respect to dependency edges), then that cycle is contained within one strongly connected component. All actions belonging to the same strongly connected component will be merged into a single action group. Finally, if all of the resulting action groups are connected with respect to merge-ability edges, then there is no dependency cycle within those action groups. Otherwise, failure is reported.

Phase 2 involves performing a certain amount of merges, where each merge is between two action groups and those two action groups are replaced by a new action group that is a union of those two action groups. Such merges occur only if the merge does not introduce a dependency cycle. Thus, an action group "ag1" can be merged with action group "ag2" only if "ag1" is not indirectly dependent on "ag2" and "ag2" is not indirectly dependent on "ag1". Any direct dependency between "ag1" and "ag2" will become a dependency of a merged group on itself (that is, the union of ag1 and ag2 will be dependent on itself). Therefore such dependency can be removed. Any indirect dependency between "ag1" and "ag2" involves some other "ag3" such that "ag1" is directly or indirectly dependent on "ag3" and "ag3" is directly or indirectly dependent on "ag1". Merging "ag1" and "ag2" in that case would introduce a dependency cycle involving "union of ag1 and ag2" and "ag3" and, hence, is not allowed. The action optimizer performs action group merges until no more merges are possible.

The domain in which the instances exist is expected to define merge edges in such a way, that the execution of the action group in whole gives a more optimal and correct solution as compared to executing the individual actions. Additionally, the domain is expected to define merge edges to allow merging of initial dependency cycles into single action groups, if such a cycle is possible for a valid model. Thus, the generated list of actions may be optimized by merging combinable actions while avoiding the creation of a cyclical dependency. Moreover, each instance's domain may provide an indication of which actions are related and mergeable, and combinable actions may be merged without merging unrelated actions. It should also be noted that, at least in some instances, there may be some mergeability edges that are mandatory. Implementers of the domain may specify such mandatory mergeability edges such that the optimizer can properly group them.

Method 300 includes an act of sorting the grouped actions according to a processing order that respects existing constraints between the entities (act 350). Action sorter 425 may take as input the full list of action groups 421 and create an ordered list of action groups 426 that can be executed one after the other (as per the domain). Based on the dependencies between actions, each action group may depend on other groups. Using this set of dependencies, the action sorter sorts them in such a way that all dependent action groups are ordered only after the "dependent upon" action groups.

Additional to the dependencies between action groups, a few generic rules may be established where all actions of type 'Unbind/Delete' are ordered ahead of all actions of other types. The categorization of action groups may vary based on the domain. In some instances, there might not be a split, while some might have more than two categories. For example, assume an entity E1 (with associated action A1) depends on another entity E2 (with associated action A2), dependencies are reversed in both categories such that a) if A1, A2 are of sort of Unbind/Delete type, A1 is performed before A2, and b) if A1, A2 are of sort of Create/Alter/Rebind type, A2 is performed before A1. Sorting the grouped actions thus includes ensuring that deletions are ordered before creations and modifications.

Method 300 includes an act of generating a domain-specific executable function that, when executed, upgrades the entities of the first instance to the second instance according to the entities' groupings and sorted processing order (act 360). Action executor 430 may generate domain-specific executable function 431 which, when executed, incrementally upgrades instance V1 (405A) to instance V2 (405B). The action executor converts the ordered list of actions to an equivalent script (or other executable function) that is domain specific and can be executed on the instance V1. Upon successful execution of the script, instance V1 is transformed to instance V2. In some cases, scripters are defined, one per a related set of actions. For a given action group, a scripter is chosen based on the super set action in the group with which other actions were merged. This scripter may be defined to script all actions that could potentially merge with the super action. The domain-specific executable function may thus be executed per action group, incrementally, until the entire instance V1 has been upgraded to V2.

Accordingly, methods, systems and computer program products are provided which incrementally upgrade an entity-relationship system. The above system may be applied to any of a variety of different entity-relationship systems. In this manner, instances and their accompanying entities may be incrementally upgraded, without creating cyclic dependencies and while conforming to all of the constraints in the instance's domain.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for incrementally upgrading an entity-relationship system, the method comprising:

an act of receiving an indication that a first instance comprising a first specified set of entities is to be upgraded to a second instance comprising a second specified set of entities, the second instance including at least one entity that is different from the first specified set of entities, the second instance comprising an upgraded version of the first instance;

an act of accessing the first and the second instances to determine the differences between the entities of each instance, including:

in a first pass, walking through entity trees corresponding to the first and second instances and determining (i) any entities that are new in the second instance relative to the first instance, (ii) any entities that are removed in the second instance relative to the first instance, and (iii) any entities that have been modified in the second instance relative to the first instance;

marking the identified modified entities for further comparison to determine which attributes and/or relationships have been modified; and in a second pass subsequent to the first pass, determining one or more attributes and/or one or more relationships that have been changed for each entity that has been modified in the second instance relative to the first instance;

an act of discovering, based on the determined differences between the first and second instances, a set of actions that, when executed, change the entities of the first instance to the entities of the second instance, wherein the set of actions is ordered such that processing order constraints are respected; and an act of incrementally upgrading the entities of the first instance to the entities of the second instance by processing the determined set of actions in the appropriate, constraint-aware order.

2. The method of claim 1, wherein the set of actions includes a create entity action for elements that were not present in the first instance but were present in the second instance.

3. The method of claim 2, wherein the set of actions includes a delete entity action for elements that were present in the first instance but were not present in the second instance.

4. The method of claim 2, wherein the set of actions includes a modify entity action for elements comprising at least one attribute or relationship that is different in the second instance than it is in the first instance.

5. The method of claim 1, wherein the set of actions is further analyzed to determine whether other corresponding actions are to be added to the set of actions to comply with other processing constraints.

6. A computer program product for implementing a method for incrementally upgrading an entity-relationship system, the computer program product comprising one or more computer-readable hardware storage devices having stored thereon computer-executable instructions that, when executed by one or more processors of the computing system, cause the computing system to perform the method, the method comprising:

an act of accessing both a first instance comprising a first specified set of entities and a second instance comprising a second specified set of entities, the second instance comprising an upgraded version of the first instance;

an act of comparing the entities of the first instance to the entities of the second instance to determine the differences between the entities, including:

in a first pass, walking through entity trees corresponding to the first and second instances and determining (i) any entities that are new in the second instance relative to the first instance, (ii) any entities that are removed in the second instance relative to the first instance, and (iii) any entities that have been modified in the second instance relative to the first instance;

marking the identified modified entities for further comparison to determine which attributes and/or relationships have been modified; and in a second pass subsequent to the first pass, determining one or more attributes and/or one or more relationships that have been changed for each entity that has been modified in the second instance relative to the first instance;

an act of analyzing the determined differences between the entities of the first and second instances to generate a list of actions that are to be performed to upgrade the entities of the first instance to the second instance;

an act of optimizing the generated list of actions by grouping actions that are performable together in the same group;

an act of sorting the grouped actions according to a processing order that respects existing constraints between the entities; and an act of generating a domain-specific executable function that, when executed, upgrades the entities of the first instance to the second instance according to the entities' groupings and sorted processing order.

7. The computer program product of claim 6, further comprising an act of executing the generated domain-specific executable function.

8. The computer program product of claim 6, wherein an analyzer is assigned to each entity to perform the difference analysis.

9. The computer program product of claim 8, wherein the generated list of actions is a proposed list of actions that is sent to one or more other analyzers to determine whether the analyzers will contribute corresponding actions to the proposed set of actions, based on constraints corresponding to the other analyzers' entities.

10. The computer program product of claim 6, wherein optimizing the generated list of actions comprises merging combinable actions while avoiding the creation of a cyclical dependency.

11. The computer program product of claim 6, wherein each instance's domain provides an indication of which actions are related and mergeable, and wherein optimizing the generated list of actions comprises merging combinable actions without merging unrelated actions.

12. The computer program product of claim 6, wherein sorting the grouped actions includes ensuring that deletions are ordered before creations and modifications.

13. The computer program product of claim 6, wherein the domain-specific executable function is executed per action group.

14. A computer system comprising the following:
one or more processors;
system memory;
one or more computer-readable storage media having stored thereon computer-executable instructions that, when executed by the one or more processors, causes the computing system to perform a method for incrementally upgrading an entity-relationship system, the method comprising the following:

an act of accessing both a first instance comprising a first specified set of entities and a second instance comprising a second specified set of entities, the second instance comprising an upgraded version of the first instance;

an act of comparing the entities of the first instance to the entities of the second instance to determine the differences between the entities, including:

in a first pass, walking through entity trees corresponding to the first and second instances and determining (i) any entities that are new in the second instance relative to the first instance, (ii) any entities that are removed in the second instance relative to the first instance, and (iii) any entities that have been modified in the second instance relative to the first instance;

marking the identified modified entities for further comparison to determine which attributes and/or relationships have been modified; and in a second pass subsequent to the first pass, determining one or more attributes and/or one or more relationships that have been changed for each entity that has been modified in the second instance relative to the first instance;

an act of analyzing the determined differences between the entities of the first and second instances to generate a list of actions that are to be performed to upgrade the entities of the first instance to the second instance;

an act of optimizing the generated list of actions by grouping actions that are performable together in the same group;

an act of sorting the grouped actions according to a processing order that respects existing constraints between the entities; and an act of generating a domain-specific executable function that, when executed, upgrades the entities of the first instance to the second instance according to the entities' groupings and sorted processing order.

15. The system of claim 14, wherein an analyzer is assigned to each entity to perform the difference analysis, and wherein the generated list of actions is a proposed list of actions that is sent to one or more other analyzers to determine whether the analyzers will contribute corresponding actions to the proposed set of actions, based on constraints corresponding to the other analyzers' entities.

* * * * *